O. H. WECKESSER.
MIXING MACHINE.
APPLICATION FILED OCT. 7, 1909.

945,651.

Patented Jan. 4, 1910.
9 SHEETS—SHEET 1.

Witnesses
Samuel Payne
X. H. Butler

Inventor
O. H. Weckesser
By H. C. Evert & Co
Attorneys

O. H. WECKESSER.
MIXING MACHINE.
APPLICATION FILED OCT. 7, 1909.

945,651.

Patented Jan. 4, 1910.

9 SHEETS—SHEET 3.

Witnesses
Samuel Payne
O. H. Butler

Inventor
O. H. Weckesser
By H. C. Evert & Co.
Attorneys

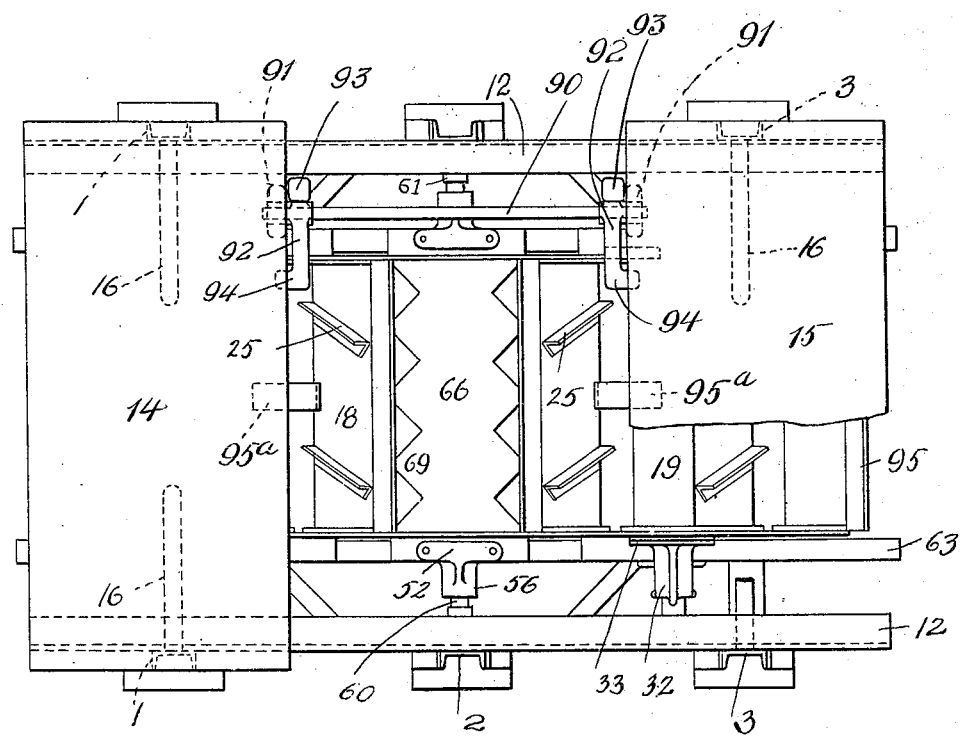

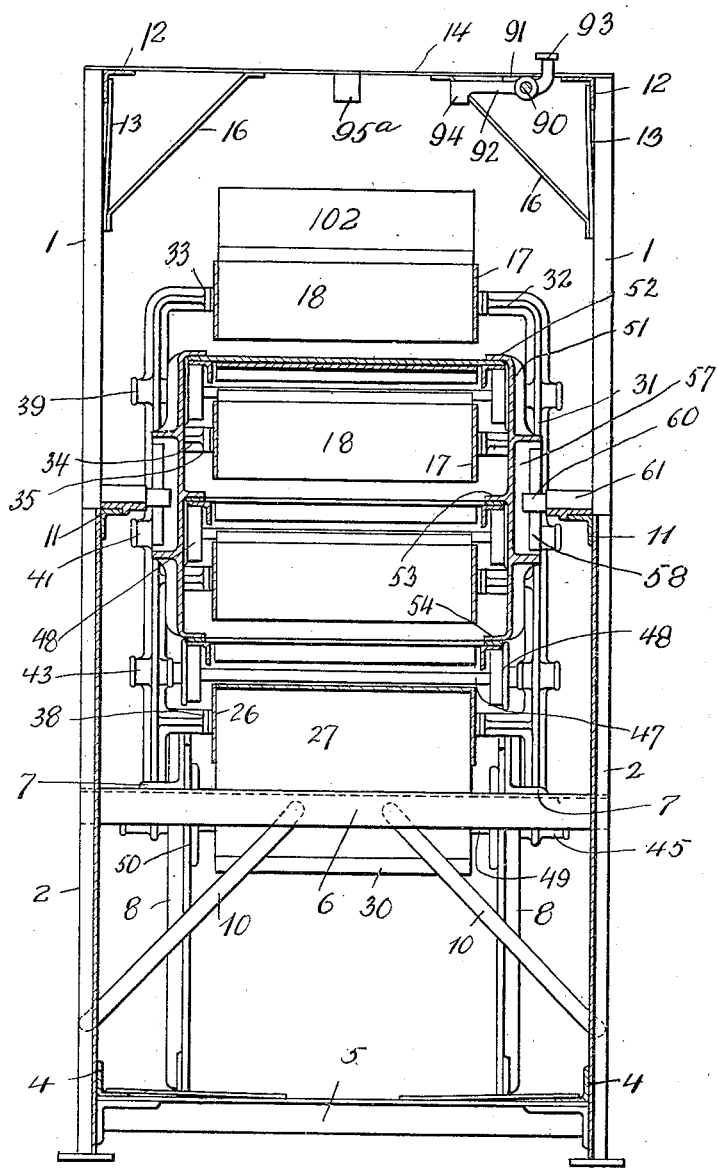

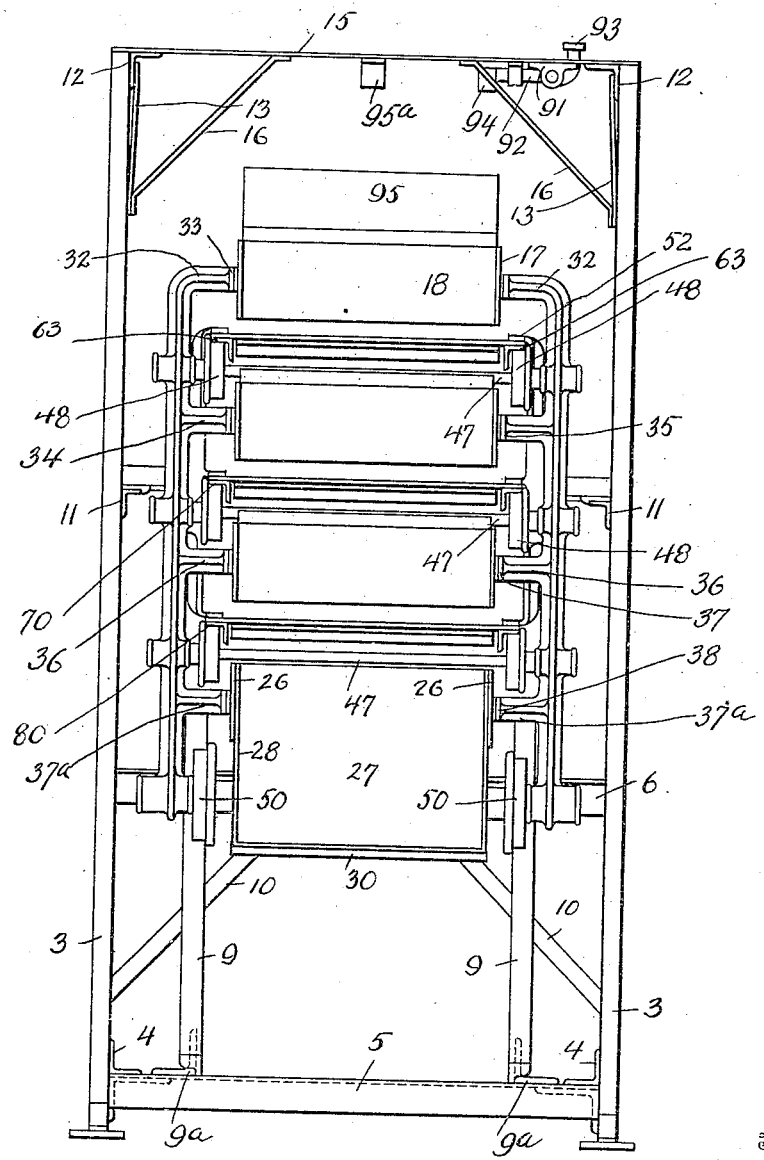

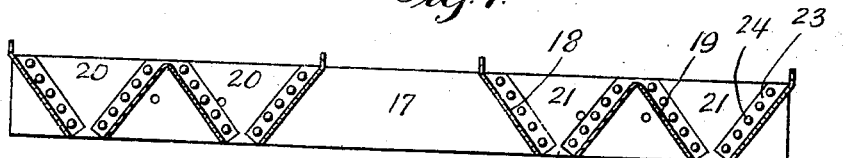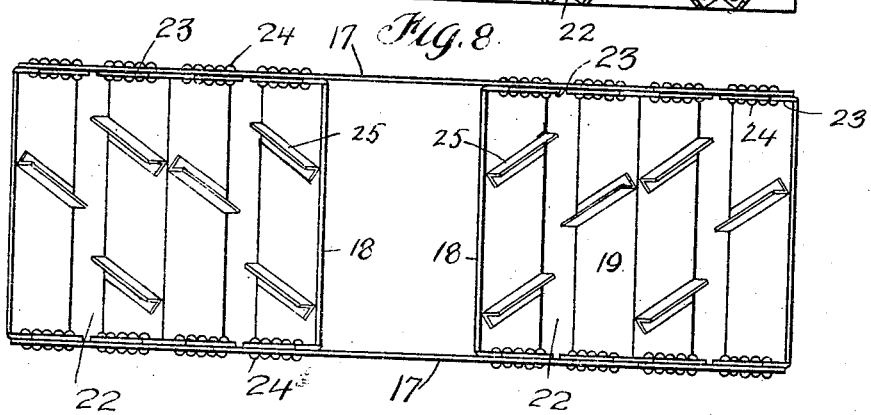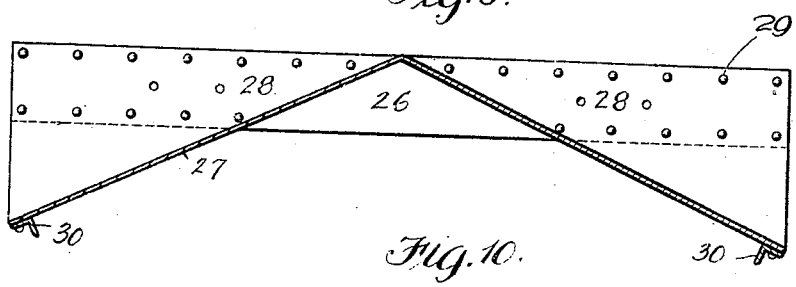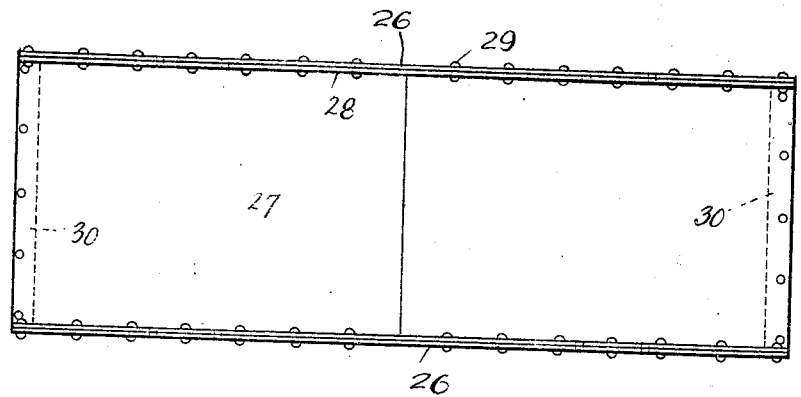

O. H. WECKESSER.
MIXING MACHINE.
APPLICATION FILED OCT. 7, 1909.

945,651.

Patented Jan. 4, 1910.
9 SHEETS—SHEET 8.

Witnesses
Samuel Payne
R. H. Butler

Inventor
O. H. Weckesser
By H. C. Evert & Co.
Attorneys

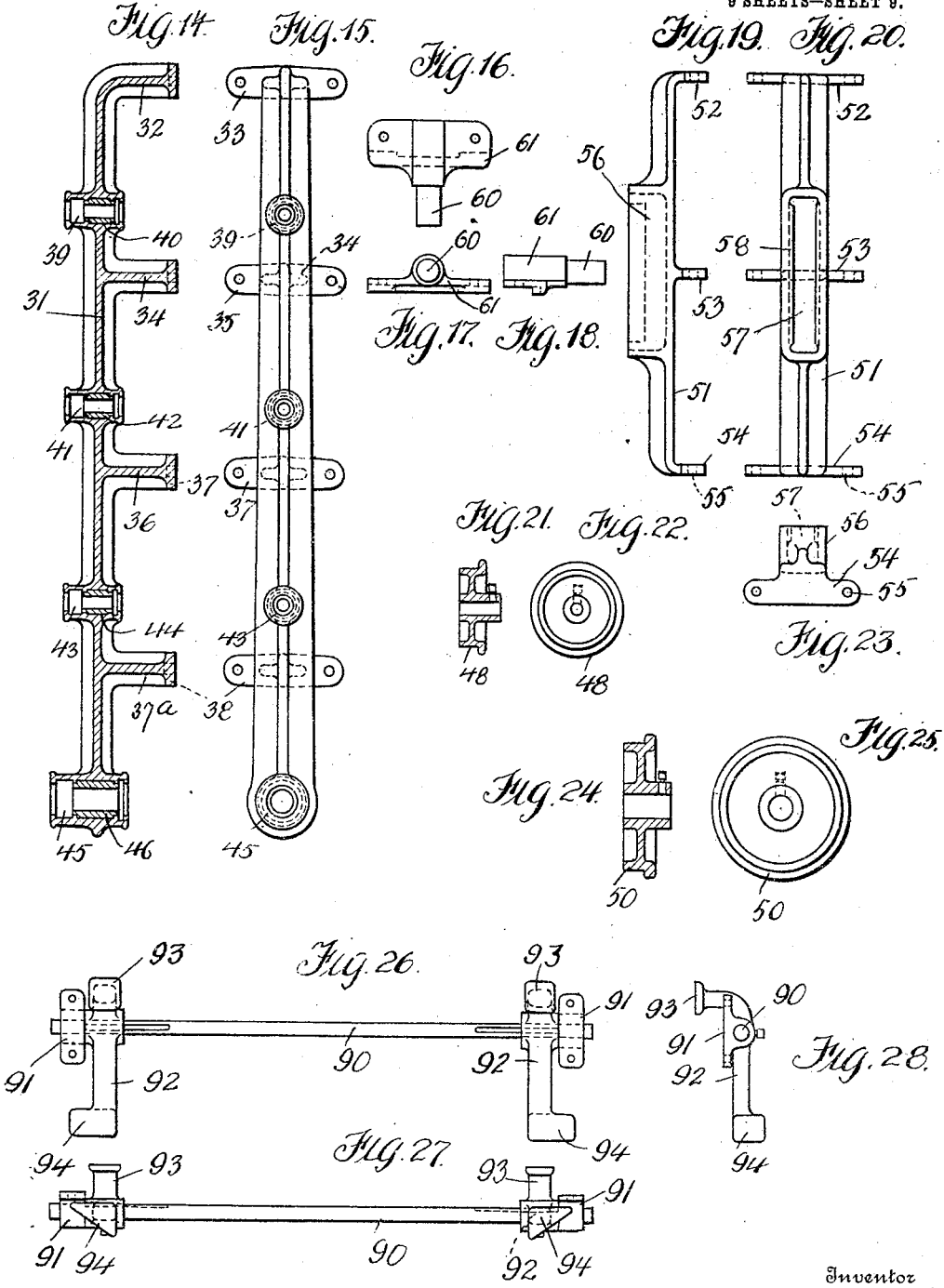

UNITED STATES PATENT OFFICE.

OSCAR H. WECKESSER, OF ROSS TOWNSHIP, ALLEGHENY COUNTY, PENNSYLVANIA.

MIXING-MACHINE.

945,651.  Specification of Letters Patent.  Patented Jan. 4, 1910.

Application filed October 7, 1909. Serial No. 521,551.

*To all whom it may concern:*

Be it known that I, OSCAR H. WECKESSER, a citizen of the United States of America, residing at Ross township, in the county of Allegheny and State of Pennsylvania, have invented certain new and useful Improvements in Mixing-Machines, of which the following is a specification, reference being had therein to the accompanying drawing.

This invention relates to mixing machines particularly designed for thoroughly mixing the ingredients entering into the make up of concrete, plaster and similar compositions and the object thereof is to provide a machine of such class with gravity shiftable means in a manner as hereinafter set forth and claimed for thoroughly mixing sand, cement and gravel or other ingredients, thereby overcoming the necessity of employing a prime motor, such as steam or electricity, when operating a machine in accordance with this invention to thoroughly mix the various ingredients entering into concrete, plaster or other composition.

Further objects of the invention are to provide a mixing machine for the purpose set forth which shall be comparatively simple in its construction, strong, durable, efficient in its use, quickly performing the mixing operation of the various ingredients to constitute the concrete or composition, readily set up, and comparatively inexpensive to manufacture.

With the foregoing and other objects in view, the invention consists of the novel construction, combination and arrangement of parts as hereinafter more specifically described and illustrated in the accompanying drawings, wherein is shown the preferred embodiment of the invention, but it is to be understood that changes, variations and modifications can be resorted to which come within the scope of the claims hereunto appended.

Figure 1:
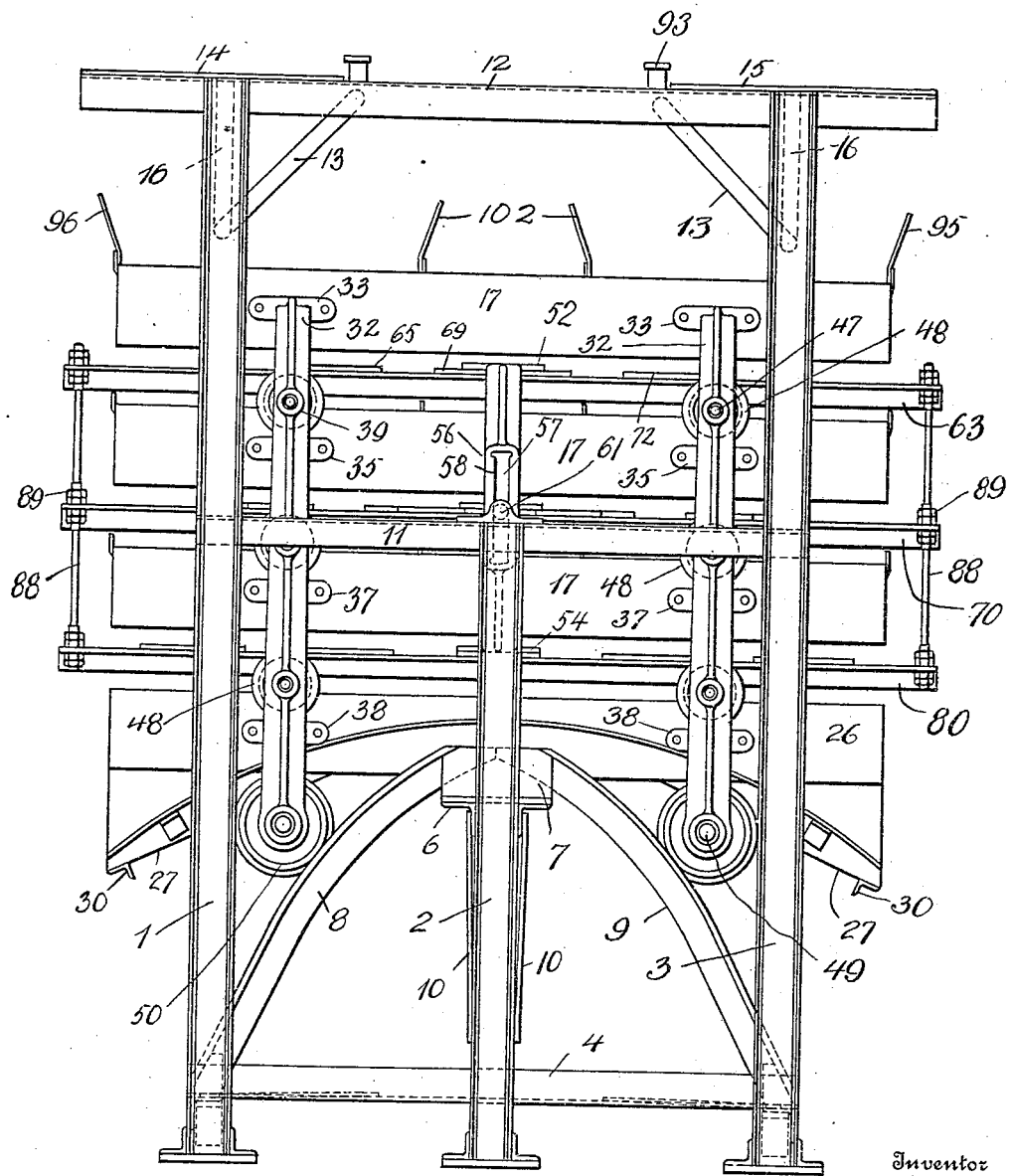
Figure 2:
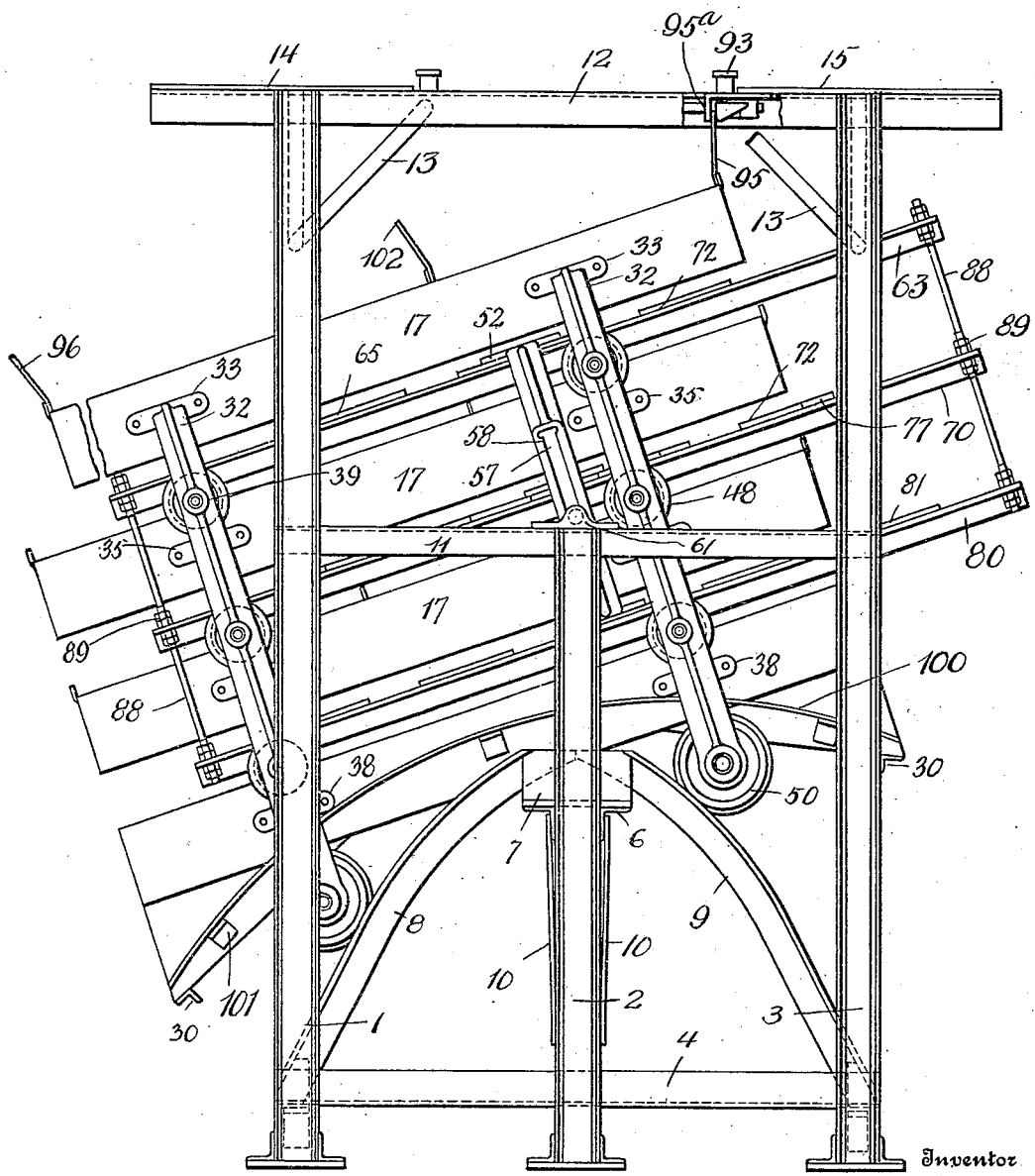
Figure 3:
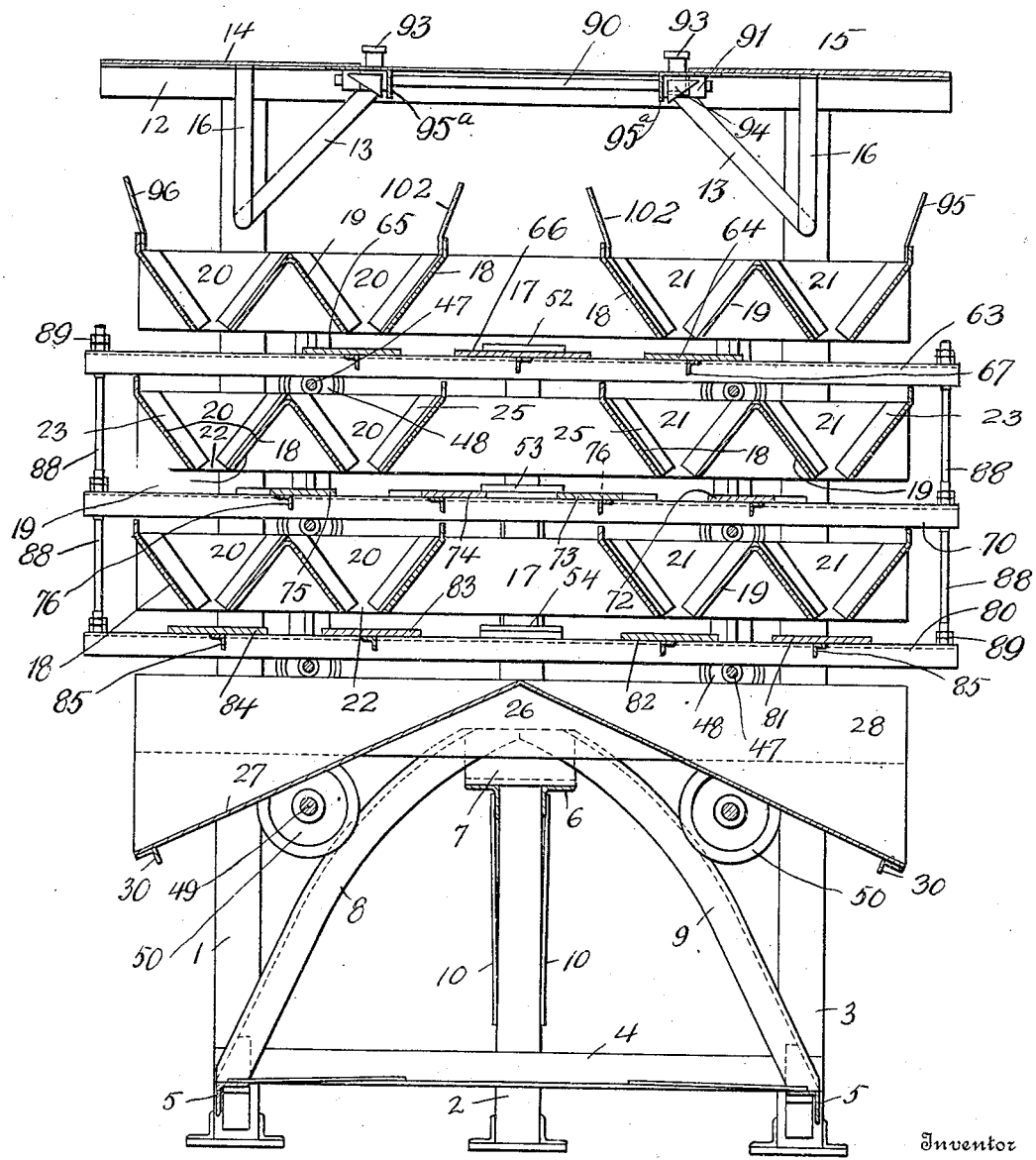
Figure 11:
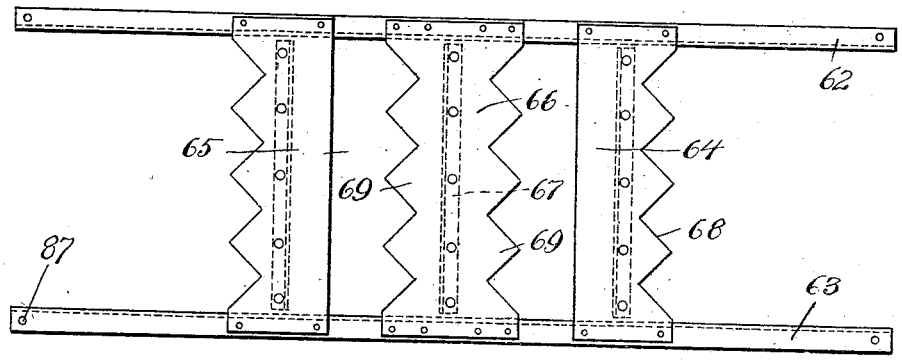
Figure 12:
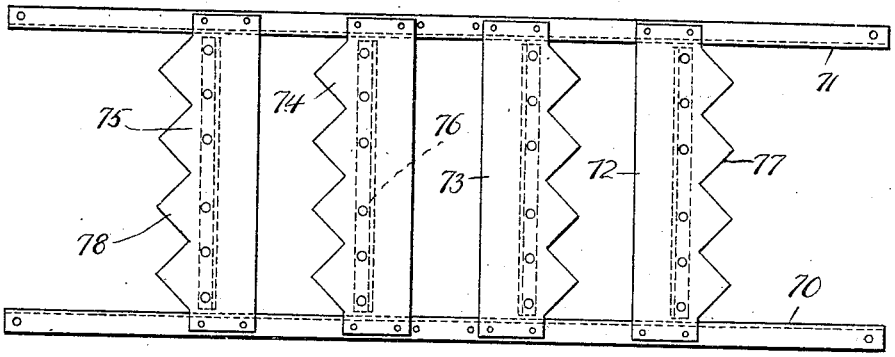
Figure 13:
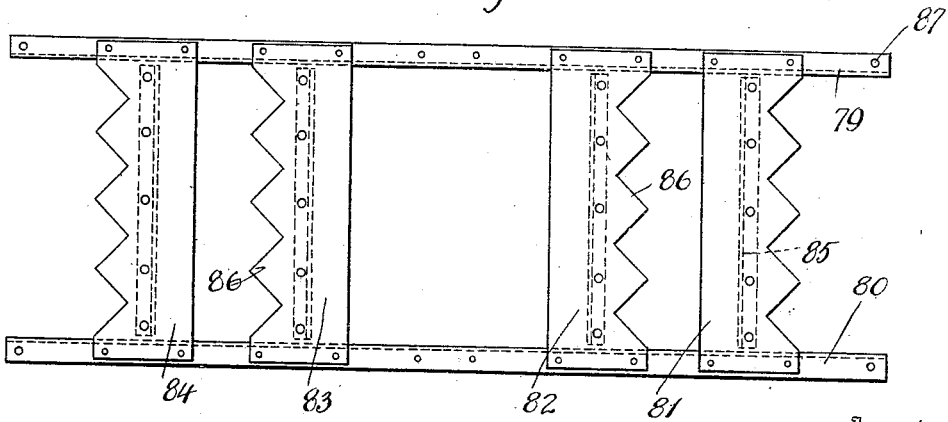

In the drawings wherein like reference numerals denote corresponding parts throughout the several views: Figure 1 is a side elevation of the machine showing the trays in a horizontal or normal position, Fig. 2 is a similar view showing the trays tilted to one side and ready to receive material at one end and to discharge the admixed material from the opposite end, Fig. 3 is a longitudinal sectional view of the machine in the position as shown in Fig. 2, Fig. 4 is a plan of the machine with the platform partly broken away, Fig. 5 is a vertical cross sectional view of the machine in the position as shown in Fig. 1, Fig. 6 is an end view of the machine in the position as shown in Fig. 1, Fig. 7 is a longitudinal sectional view of one of the trays, Fig. 8 is a plan of the same, Fig. 9 is a longitudinal sectional view of the discharge tray or chute, Fig. 10 is a plan of the same, Fig. 11 is a plan of the upper shiftable bottom plate, Fig. 12 is a similar view of the intermediate bottom plate, Fig. 13 is a plan of the lower bottom plate, Fig. 14 is a vertical sectional view of one of the sections of the carriage, Fig. 15 is a side elevation of the same, Fig. 16 is a detail of one of the bearings, Fig. 17 is an end view of the same, Fig. 18 is a side elevation, Fig. 19 is a front elevation of one of the sections of the tilting head, Fig. 20 is a side elevation of the same, Fig. 21 is a vertical sectional view of one of the tray wheels, Fig. 22 is a side elevation of the same, Fig. 23 is a plan of the section of the head as shown in Fig. 20, Fig. 24 is a vertical sectional view of one of the carriage wheels, Fig. 25 is a side elevation of the same, Fig. 26 is a plan of the latches as shown in Fig. 4 of the drawings, Fig. 27 is an end elevation of the same, and Fig. 28 is an end view.

A mixing machine in accordance with this invention comprises a supporting frame, a plurality of mixing trays, a tilting head provided with a plurality of bottom plates for the trays, a duplex discharge chute and a carriage for the trays and chute.

*Supporting frame.*—The supporting or machine frame consists of two series of vertically disposed uprights, the uprights of each series being indicated by the reference characters 1, 2 and 3, the upright 2 being the intermediate one and of less height than either of the uprights 1 and 3. Each series of uprights are connected together by the longitudinally extending braces 4, which have their ends mounted upon transversely-extending braces 5 connecting the uprights 1 and 3 of one series to the uprights 1 and 3 of the other series. The intermediate upright 2 of one series is connected at a point intermediate its ends to the intermediate upright 2 of the other series through the medium of transversely-extending angle irons 6 to which are secured angle-shaped members 7 having attached thereto the upper ends of the curved angle bars 8 and 9, the lower ends of said curved angle irons 8 and 9 being secured to the transversely-extending braces 5 by angle irons 9ª. Two angle-shaped members 7 are provided and they are arranged in proximity to the ends of the angle irons 6. The curved angle bars 8 and 9 constitute tracks for a carriage to be hereinafter referred to. The position of the angle irons or beams 6 is approximately centrally of the ends of the uprights 2. Inclined brace members 10 are secured to the angle irons or beams 6 and also to the intermediate uprights 2. The upper end of the intermediate upright 2 of each series is connected to the uprights 1 and 2 of its respective series by a longitudinally-extending brace member 11. The upper ends of the uprights 1 and 3 of each series are connected together by a longitudinally-extending brace member 12 and which is of a length as to project beyond the said uprights. Inclined brace members 13 connect the members 12 with the uprights 1 and 2. Mounted upon the brace members 12 at each end thereof are the platforms 14 and 15 which are spaced from each other and braced by the inclined members 16. The opening formed between the platforms 14 and 15 is used for the passage of the ingredients to be mixed.

*Mixing trays.*—The machine comprises a plurality of mixing trays, as shown, three in number, the trays being superposed with respect to each other and as the construction of each of the trays is the same, but one will be described. Each of the trays as clearly shown in Figs. 7 and 8 consist of a pair of longitudinally-extending side plates 17 connected together by pairs of transversely-extending plates 18 and transversely-extending inverted V-shaped plates 19. The plates 18 and 19 are so disposed that a pair of plates 18 will associate with a plate 19 whereby at one end of the tray a plurality or group of pockets 20 will be provided and at the other end of the tray a plurality or group of pockets 21 will be provided. Each pair of plates 18 is so disposed with respect to the plate 19 as to provide each pocket with a contracted open bottom 22. Each of the plates 18 and 19 is flanged at each end as at 23, the flanges abutting against the inner or confronting faces of and are secured to the plates 17 by the rivets 24. The plates 18 and 19 which form the walls of the pockets are provided with retarders disposed at an inclination with respect to the walls of the pockets and indicated by the reference character 25. The pockets of one tray are adapted to receive the ingredients to be mixed and which are discharged therefrom into the pockets of a lower tray, the discharge of the material from the pockets is retarded somewhat by the elements 25 so as to obtain a better mixing of the ingredients, which would not be the case if the material passed very rapidly from the pockets of one tray into the pockets of a lower tray.

*Discharge chute.*—Arranged below the lowermost mixing tray is a duplex discharge chute which consists of a pair of longitudinally-extending side plates 26 connected together by an inverted V-shaped member 27 flanged at each side as at 28. The flanges 28 are secured to the plate 26 by the rivets 29. The member 27 provides what may be termed two chutes, one of which is arranged below and associates with the pockets at one end of the trays and the other of which is arranged below and associates with the pockets at the other end of the trays. The ends of the member 27 are reinforced by the transversely-extending angle irons 30.

*Carriage.*—The function of the carriage is to shift the mixing trays downwardly at an inclination and in unison with each other, the carriage traveling or moving upon the tracks 7 and 8. The carriage consists of four upright sections, each of the same construction and best shown in Figs. 14 and 15. As each of the sections of the carriage is similar in construction, but one will be described. Each of the sections of the carriage consists of an upright member 31 provided at its top with an inward extension 32 having right angularly-disposed apertured lugs 33. Below the extension 32, the body 31 is provided with an inward extension 34 having right angularly-disposed apertured lugs 35, below the extension 34 the body 31 is provided with an inward extension 36 having right angularly-disposed apertured lugs 37, and below the extension 36 the body 31 is provided with an inward extension 37ª having right angularly-disposed apertured lugs 38. Intermediate the extensions 32 and 34 and nearer the extension 34 than the extension 32, the body 31 is formed with an opening 39 having mounted therein a bearing sleeve 40. The body 31 in proximity to the extension 36 is further formed with an opening 41 in which is mounted a bearing sleeve 42 and in proximity to the extension 37 with an opening 43 having mounted therein a bearing sleeve 44. The lower end of the body 31 is also formed with an opening 45 of greater diameter than either of the other openings and in which is arranged a bearing sleeve 46 of greater diameter than either of the other bearing sleeves. The sections of the carrier are arranged in pairs and so disposed that the right angularly-disposed lugs of one pair of sections will be opposite the right-angularly-disposed lugs of the other pair of sections. The uppermost mixing tray is secured to the opposing lugs 33, the intermediate mixing tray to the opposing lugs 35 and the lower mixing tray to the opposing lugs 37. The discharge chute is secured to the opposing lugs 38. Journaled in the opposing bearing sleeves 40, 42 and 44 respectively are the transversely-extending shafts 47, each carrying a pair of rollers 48, and journaled in the opposing bearing sleeves 46 are transversely-extending shafts 49 on which are mounted the wheels 50 which travel upon the tracks 8 and 9.

*Tilting head and tray bottom plates.*— The tilting head is formed of two sections and the function thereof is to shift the tray bottom plates so as to alternately open and close the groups of pockets of each tray. As each of the tilting heads is of the same construction, but one will be described. Each of the sections of the tilting head consists of an upright body portion 51 (as best shown in Figs. 19, 20 and 23) and which is formed on its inner face with an upper, an intermediate, and a lower right angularly-disposed supporting arm 52, 53 and 54 respectively. Each of the arms is apertured in proximity to each end as at 55. The outer face of the body portion 51 is off-set as at 56 and formed with an elongated recess 57 with the side walls 58 thereof overlapping the inner wall so as to provide a retaining means for a headed trunnion 60, the overlapping side walls 58 engage the head of the trunnion and retain it in the recess 57. The trunnion 60 is mounted in a bearing 61, supported upon the longitudinally-extending braces 11. One section of the tilting head is opposite to the other section thereof and secured to the opposing arms 52 of the tilting head are the longitudinally-extending angle bars 62 and 63, best shown in Fig. 11, connected together by the transversely-extending plates 64, 65 and 66, each of said plates is reinforced by a single transversely-extending strip 67 secured to the lower face of its respective plate. The plates 64 and 65 are the outer plates and the plate 67 is the intermediate one. The plates 64 and 65 have their outer edges toothed or serrated as at 68 and the plate 66 has both of its transverse edges toothed or serrated as at 69. The angle bars 62, 63 in connection with the plates 64, 65, and 66 constitute the upper shiftable bottom for the upper mixing tray. Secured to the opposing arms 53 of the tilting head are the angle bars 70, 71 connected together by the transversely-extending plates 72, 73, 74, and 75 each reinforced by a strip 76 secured to the lower face of its respective plate. The plates 72, 73 have their outer transverse edges toothed or serrated as at 77 and the plates 75, 76 having their outer transverse edges toothed or serrated as at 78, these latter are oppositely-disposed with respect to the toothed edges 77 of the plates 72, 73. The angle bars 70, 71 and the plates 72, 73, 74, and 75 constitute what is termed the intermediate shiftable bottom and associates with the intermediate mixing tray. The opposing arms 54 of the tilting head have secured thereto the longitudinally-extending angle bars 79 and 80 connected together by the transversely-extending plates 81, 82, 83 and 84, the said plates being arranged in pairs and with the pairs spaced from each other. Each of the plates 81, 82, 83 and 84 is reinforced by a strip 85 secured to the lower face of its respective plate and the outer edges of each of the plates is toothed or serrated as at 86, the toothed edges of the plates 81, 82 being oppositely-disposed with respect to the toothed edges of the plates 83, 84. The edges of the various plates are toothed to cause a better mixing of the material as the material passes from an upper to a lower tray pocket. Each of the angle bars 62, 63, 70, 71, 79, 80 at each end is formed with an opening 87 and the openings of the bars alining with each other and extending through the openings are the threaded coupling rods 88 upon which are mounted clamping nuts 89 engaging the coupling rods whereby the ends of the angle bars are braced and connected together as well as maintained permanently a pre-determined distance apart so as to prevent any possibility of the ends of the angle bars bending during the operation of the machine. During the operation of the machine and when the trays are shifted downwardly at an inclination through the medium of the carrier the rollers 48 engage the lower face of the angle rods which constitute elements of the shiftable tray bottoms.

The machine further comprises a means for maintaining the trays in an inclined position during the filling of one of the groups of pockets of the upper of the trays until the required amount of material has been delivered to the pockets, and the said means consists of a longitudinally-extending rock shaft 90 which is journaled at each end in a bearing 91 secured to the lower face of each of the platforms at one side thereof. The shaft 90 extends across the opening formed by spacing of the platforms 14 and 15. Eccentrically mounted upon the shaft 90 in proximity to each of the platforms is a transversely extending lever 92, having its shorter arm provided with a vertically disposed tread 93 and the terminus of its elongated arm with a depending beveled latch 94. Associating with the latches 94 are stop plates 95 and 96, carried by the ends of the uppermost tray, and these stop plates are adapted to engage the angle irons 95ª positioned centrally of the confronting edges of platforms 14 and 15. The latches in their lowermost position are adapted to engage the stop plates 95 and 96 and retain said stop plates in engagement with the angle irons 95ª, when the weight of the material supplied to the uppermost tray overbalances the trays. In this connection, it will be assumed that the trays are in the position shown in Fig. 2 of the drawings and that material is being supplied through the opening formed between the platforms 14 and 15 to the pockets 21 of the upper tray, the stop plate 95 being held by one of the latches 94 at one end of the machine. After the necessary amount of material has been supplied to the pockets 21 the operator applies pressure to the tread 93 elevating the lever 90 to move the latch clear of the path of the stop plate 95 whereby the trays are released and owing to the weight of the material supplied to the pockets 20 overbalancing the trays, the trays as well as the head are tilted and the carriage is caused to travel downwardly in a direction opposite to that shown in Fig. 2 carrying the trays and duplex chute therewith and causing the head to tilt on its bearing, whereby the trays, head and bottom will be caused to assume a position the opposite of that shown in Fig. 2. When pressure is removed from the tread 93 the latches then fall down and the latch at the other end of the machine is in the path of the stop plate 96, which will arrest movement in the opposite direction of the trays during the supplying of the material and the trays will be retained in the position to which they have been shifted until the shaft 90 is again rocked to shift the latch out of the plate 96 so that the weight of the material supplied will overbalance the trays.

The operation of the machine is as follows: It will be assumed that the machine is in the position shown in Fig. 2, it being shifted to such position manually; and, the several ingredients which are to be mixed together, by way of example sand, cement and gravel so as to provide a concrete, are supplied in any suitable manner through the opening formed between the platforms 14 and 15 to the pockets 21 of the upper tray. After the required amount of material has been supplied to the pockets 21, the shaft 90 is rocked to shift the latches 94 out of the path of the plate 95, the weight of the material over-balancing the trays will cause them and the chute to tilt in unison to a horizontal position and then to an inclined position, the carriage shifting the trays downwardly at an inclination by traveling upon the tracks 8 and 9. When the trays are tilted from the position shown in Fig. 2, the head is also tilted upon its bearing whereby the position of the bottom plates is changed with respect to the contracted open bottoms of the pockets. When the trays are in the position as shown in Fig. 2 the contracted bottoms of the pockets 21 of the upper trays are closed by the plates 64 and 66, but immediately upon the tilting of the trays from the position shown in Fig. 2 the material begins to discharge from the pockets 21 of the upper tray into the outer pockets 21 of the intermediate tray and then into the pockets 21 of the lowermost tray, the movement of the material being retarded somewhat by the elements 25 and as the material leaves the pockets 21 of the upper tray it engages with the toothed edges 68 and 69 of the plates 64 and 66 which assists in the mixing of the ingredients from one group of pockets 21 to the other. As the trays assume a horizontal position, the plate 64 moves beneath the innermost pocket of the upper group, but the innermost pocket 21 of the intermediate tray has previously received the charge from the innermost pocket of the upper tray. The plate 66 first serves as the bottom for the innermost pocket 21 of the upper tray and then for the innermost pocket 20 of the same tray, but the plates associated with the intermediate and lower trays serve for their respective pockets.

Material entering the outermost pocket of the upper tray passes through the outermost pockets of the intermediate and lower trays, but during its passage it is retarded by the plates 64, 72 and 81 and thoroughly mixed by the serrated edges of said plates and the elements 25 of the pockets 21. It is also true that material entering the innermost pockets 21 of the upper tray passes through the innermost pockets 21 of the intermediate and lower trays, and is retarded and commingled in its movement by the plates 66, 73 and 82. For instance, with the trays in the position shown in Fig. 2, the pockets 21 of the uppermost tray are closed by the plates 64 and 66 and after the trays are released and the pockets 21 commenced to move downwardly, the plates 64 and 66 gradually move from beneath the pockets 21 of the uppermost tray and discharge the material into the pockets 21 of the intermediate tray. The plates 72 and 73 close these pockets when receiving material, and when the trays are about in a horizontal position the plates 72 and 73 commence to move from beneath the pockets 21 of the intermediate tray and allow the contents of the pockets 21 of the intermediate tray to enter the pockets 21 of the lowermost tray, and the plates 81 and 82 close these pockets until the material has been received. The pockets 21 of the trays are now below the horizontal position shown in Fig. 3 and as the downward movement of the pockets 21 is continued, the plates 81 and 82 gradually move from beneath the pockets 21 of the lowermost tray and allow the contents thereof to discharge into the chute from where it can pass into wheelbarrows or receptacles provided therefor.

The plates 64, 67, 65, 72, 73, 74, 75, 81, 82, 83 and 84 constitute means for temporarily retarding the passage of the ingredients from the pockets of the upper tray to the chute whereby said action will assist in the mixing of the ingredients so that by the time the material reaches the chute it will be thoroughly mixed together. The toothed edges of the plates herein referred to materially assist in the mixing operation as is evident. The discharge of the material from the pockets at one side of the uppermost tray begins the moment the trays are released and when the weight of the material causes the trays to tilt so that they will be shifted from one inclined position to the other. The toothed plates are so disposed with respect to the pockets as to temporarily retard the discharge of material from one tray to the other and as the trays shift on the plates the teeth of the plates will be impacted upon by the material as it leaves the pockets whereby the mixing operation will be facilitated.

To insure a positive and uninterrupted operation of my machine, I provide the outer sides of the bottom tray or chute with curved deflectors 100 extending from one end of the chute to the opposite end thereof, these deflectors being supported by brackets 101 connected to the outer ends of the side plates 26. The object of the deflectors is to prevent sand, gravel or other matter from interfering with the movement of the wheels 50 upon the tracks 8 and 9. Further, I provide the uppermost tray with deflectors 102 adapted to deflect the material into the pockets 20 and 21 of said tray.

What I claim is:

1. In a mixing machine, a plurality of superposed tiltable material receiving trays adapted to communicate with each other, a movable carriage for and connected to said trays and shifted by the weight of the material supplied to the trays, said trays sliding in unison with the carriage, and tiltable toothed bottom closures for the trays tilted by the weight of the load and adapted when tilted to change the relative position thereof with respect to the trays and to facilitate the mixing on the discharge of the material from one tray to the other.

2. A mixing machine comprising a plurality of superposed tiltable material-receiving trays provided with pockets adapted to communicate with each other, a movable carriage for and connected to said trays and shifted by the weight of the material, said trays sliding with said carriage, and a tiltable element tilted by the weight of the load and provided with toothed pocket closures, whereby when said element is tilted, the relative position of the pocket closures with respect to the trays will be changed and the mixing of the material facilitated by the toothed portions of the pocket closures.

3. A mixing machine comprising a tilting head provided with toothed bottom plates shiftable with the head, tiltable material-receiving trays provided with pockets adapted to be closed by said plates, said head when tilted changing the relative position of the toothed bottom plates with respect to the trays, whereby the pockets of an upper tray will be shifted clear of their respective toothed bottom plates and the material discharged in the pockets of a lower tray and the mixing operation facilitated by the toothed portions of the plates, and a movable carriage for and connected to said trays and shifted by the weight of the material whereby a sliding movement is imparted to the trays so that the relative position of the toothed bottom plates with respect to the trays will be changed.

4. A mixing machine comprising a tilting head provided with toothed bottom plates shiftable with the head, tiltable material-receiving trays provided with pockets adapted to be closed by said plates, said head when tilted changing the relative position of the toothed bottom plates with respect to the trays, whereby the pockets of an upper tray will be shifted clear of their respective toothed bottom plates and the material discharged in the pockets of a lower tray and the mixing operation facilitated by the toothed portions of the plates, a movable carriage for and connected to said trays and shifted by the weight of the material whereby a sliding movement is imparted to the trays so that the relative position of the toothed bottom plates with respect to the trays will be changed, and retarding devices for the material mounted in said trays.

5. A mixing machine comprising a tilting head provided with toothed bottom plates shiftable with the head, tiltable material-receiving trays provided with pockets adapted to be closed by said plates, said head when tilted changing the relative position of the toothed bottom plates with respect to the trays, whereby the pockets of an upper tray will be shifted clear of their respective toothed bottom plates and the material discharged in the pockets of a lower tray and the mixing operation facilitated by the toothed portions of the plates, a movable carriage for and connected to said trays and shifted by the weight of the material whereby a sliding movement is imparted to the trays so that the relative position of the toothed bottom plates with respect to the trays will be changed, retarding devices for the material mounted in said trays, and means for coupling the bottom closures together.

6. A mixing machine comprising a plurality of tiltable material-receiving trays, each provided with a plurality of pockets, toothed closures for the pockets of the trays, and means whereby said trays are tilted at an inclination and shifted in the direction of their length for moving the pockets of one tray clear of the toothed closures therefor, so that the material in said tray will be discharged into the pockets of an adjacent tray.

7. A mixing machine comprising a plurality of tiltable material-receiving trays, each provided with a plurality of pockets, toothed closures for the pockets of the trays, means whereby said trays are tilted at an inclination and shifted in the direction of their length for moving the pockets of one tray clear of the toothed closures therefor, so that the material in said tray will be discharged into the pockets of an adjacent tray, and retarding devices mounted in the pockets of the trays.

8. A mixing machine comprising superposed tiltable trays, each provided with pockets having contracted open bottoms, and a tilting head provided with toothed plates constituting retarding devices for the passage of the material from the pockets of one tray into the pockets of another tray.

9. A mixing machine comprising superposed tiltable trays, each provided with pockets having contracted open bottoms, a tilting head provided with toothed plates constituting retarding devices for the passage of the material from the pockets of one tray into the pockets of another tray, and retarding devices mounted in the pockets of each of the trays.

10. A machine for the purpose set forth comprising a movable carriage shifted by the weight of the load, superposed tiltable trays connected thereto and having the ends thereof provided with pockets, and shiftable toothed means for retarding and controlling the discharge of the pockets of one tray into the pockets of another tray.

11. A machine for the purpose set forth comprising a movable carriage shifted by the weight of the load, superposed tiltable trays connected thereto and having the ends thereof provided with pockets, shiftable toothed means for retarding and controlling the discharge of the pockets of one tray into the pockets of another tray, and retarding means mounted in the pockets of each of the trays.

12. A mixing machine comprising a plurality of superposed trays, each provided at one end with a group of pockets having open bottoms, said trays being tiltable, a movable carriage connected to the trays and shifted by the weight of the load and shifting the trays therewith when the trays are tilted, supporting means for said carriage, and a plurality of toothed shiftable plates arranged below the trays for governing the discharge of the material from the pockets of one tray into the pockets of another tray when the trays are tilted and shifted by the carriage and further constituting means to facilitate the mixing of the ingredients when discharged from the pockets of one tray into the pockets of another tray.

13. A mixing machine comprising a plurality of superposed trays, each provided at one end with a group of pockets having open bottoms, said trays being tiltable, a movable carriage connected to the trays and shifted by the weight of the load and shifting the trays therewith when the trays are tilted, supporting means for said carriage, a plurality of toothed shiftable plates arranged below the trays for governing the discharge of the material from the pockets of one tray into the pockets of another tray when the trays are tilted and shifted by the carriage, and means for coupling said trays together.

14. In a mixing machine, tiltable trays having open bottoms, a plurality of shiftable toothed elements for controlling the discharge of the material from one tray to another and for facilitating the mixing of the ingredients during the discharge of the material from one tray to the other, and means for shifting the trays at an inclination when the trays are tilted.

15. In a mixing machine, tiltable trays having open bottoms, a plurality of shiftable toothed elements for controlling the discharge of the material from one tray to another and for facilitating the mixing of the ingredients during the discharge of the material from one tray to the other, means for shifting the trays at an inclination when the trays are tilted, and a duplex discharge chute connected with and shifted by the last mentioned means.

16. In a mixing machine, tiltable trays having open bottoms, a plurality of shiftable toothed elements for controlling the discharge of the material from one tray to another and for facilitating the mixing of the ingredients during the discharge of the material from one tray to the other, means for shifting the trays at an inclination when the trays are tilted, a duplex discharge chute connected with and shifted by the last mentioned means, and retarding devices mounted in said trays.

17. In a mixing machine, tiltable trays having open bottoms, a plurality of shiftable toothed elements for controlling the discharge of the material from one tray to another tray, means for shifting the trays at an inclination when the trays are tilted, and a tiltable supporting means for said toothed elements, said tiltable supporting means changing the position of said toothed elements relative to the open bottoms of the trays.

18. In a mixing machine, tiltable trays having open bottoms, a plurality of shiftable toothed elements for controlling the discharge of the material from one tray to another and for facilitating the mixing of the ingredients during the discharge of the material from one tray to the other, means for shifting the trays at an inclination when the trays are tilted, and means for coupling the toothed elements together.

19. In a mixing machine, tiltable trays having open bottoms, a plurality of shiftable toothed elements for controlling the discharge of the material from one tray to another and for facilitating the mixing of the ingredients during the discharge of the material from one tray to the other, means for shifting the trays at an inclination when the trays are tilted, and releasable means for arresting the tilting movement of the trays when supplying material thereto.

20. In a mixing machine, tiltable trays having open bottoms, a plurality of shiftable toothed elements for controlling the discharge of the material from one tray to another and for facilitating the mixing of the ingredients during the discharge of the material from one tray to the other, means for shifting the trays at an inclination when the trays are tilted, releasable means for arresting the tilting movement of the trays when supplying material thereto and a duplex chute connected with and shifted by the last mentioned means.

21. In a mixing machine, tiltable trays having open bottoms, a plurality of shiftable toothed elements for controlling the discharge of the material from one tray to another and for facilitating the mixing of the ingredients during the discharge of the material from one tray to the other, means for shifting the trays at an inclination when the trays are tilted, a duplex discharge chute connected with and shifted by the last mentioned means, retarding devices mounted in said trays, and releasable means for arresting the tilting movement of the trays when supplying material thereto.

22. In a mixing machine, tiltable trays having open bottoms, a plurality of shiftable toothed elements for controlling the discharge of the material from one tray to another tray, means for shifting the trays at an inclination when the trays are tilted, a tiltable supporting means for said toothed elements, said tiltable supporting means changing the position of said toothed elements relative to the open bottoms of the trays, and releasable means for arresting the tilting movement of the trays when supplying material thereto.

23. In a mixing machine, tiltable trays having open bottoms, a plurality of shiftable toothed elements for controlling the discharge of the material from one tray to another and for facilitating the mixing of the ingredients during the discharge of the material from one tray to the other, means for shifting the trays at an inclination when the trays are tilted, means for coupling the toothed elements together, and releasable means for arresting the tilting movement of the trays when supplying material thereto.

In testimony whereof I affix my signature in the presence of two witnesses.

OSCAR H. WECKESSER.

Witnesses:
 KARL H. BUTLER,
 MAX H. SROLOVITZ.